(12) United States Patent
Isherwood et al.

(10) Patent No.: US 6,616,803 B1
(45) Date of Patent: Sep. 9, 2003

(54) MAKING PAPER

(75) Inventors: Roland Isherwood, Whitchurch (GB); Stephen David Ridyard, Bolton (GB)

(73) Assignee: De la Rue International Limited, Basingstoke (GB)

( * ) Notice: Subject to any disclaimer, the term of this patent is extended or adjusted under 35 U.S.C. 154(b) by 0 days.

(21) Appl. No.: 09/869,166

(22) PCT Filed: Dec. 16, 1999

(86) PCT No.: PCT/GB99/04257

§ 371 (c)(1),
(2), (4) Date: Nov. 9, 2001

(87) PCT Pub. No.: WO00/39391

PCT Pub. Date: Jul. 6, 2000

(30) Foreign Application Priority Data

Dec. 29, 1998  (GB) ............................................. 9828770

(51) Int. Cl.$^7$ ............................................. D21H 21/42
(52) U.S. Cl. ........................ 162/103; 162/124; 162/140; 162/268; 283/72
(58) Field of Search ................................ 162/103–108, 162/123, 124, 125, 132, 134, 138, 140, 267–8; 283/72, 73, 74, 81, 82–86, 94, 901

(56) References Cited

U.S. PATENT DOCUMENTS

| 61,321 A | * | 1/1867 | Crane | 162/140 |
| 964,014 A | * | 7/1910 | Gernaert | 162/104 |
| 2,126,922 A | * | 8/1938 | Robinson | 162/103 |
| 4,462,866 A | * | 7/1984 | Tooth et al. | 162/103 |
| 4,462,867 A | * | 7/1984 | Fuller | 162/103 |
| 5,405,500 A | * | 4/1995 | Knight | 162/103 |
| 5,567,276 A | * | 10/1996 | Boehm et al. | 162/103 |
| 5,783,275 A | * | 7/1998 | Muck et al. | 162/104 |
| 5,944,927 A | * | 8/1999 | Seifert | 156/153 |
| 5,961,152 A | * | 10/1999 | Washburn et al. | 156/176 |

FOREIGN PATENT DOCUMENTS

| EP | 0625431 | 11/1994 |
| WO | 9401291 | 1/1994 |

* cited by examiner

*Primary Examiner*—Steven P. Griffin
*Assistant Examiner*—Eric Hug
(74) *Attorney, Agent, or Firm*—Dykema Gossett PLLC (57) ABSTRACT

This invention is directed to improvements in paper incorporating an elongate impermeable element, to a method of making such paper and to documents made therefrom. The invention therefore comprises a method of making single ply paper having an elongate impermeable strip at least partially embedded therein, comprising the steps of blinding one or more selected areas of a porous support surface, depositing a first layer of paper fibres onto the porous support surface around the blinded areas, bringing the strip to lie in contact with the blinded areas of the support surface such that at least edges of the strip over lie the deposited fibres, and depositing a further layer of paper fibres over the first layer and the impermeable strip to securely embed the edges of the strip within the paper, said blinded areas being impermeable to substantially prevent the deposition of fibres thereon before the security element is laid thereover and to thereby form a plurality of discrete translucent or transparent windows in a first surface of the paper in which regions of one side of the strip are exposed, wherein substantially no paper fibres are deposited along on an opposite side of the length of the strip in a region between the edges to thereby expose a continuous area of the strip at a second surface of the paper.

19 Claims, 7 Drawing Sheets

MAKING PAPER

BACKGROUND OF THE INVENTION

1. Field of the Invention

This invention is directed to improvements in paper incorporating an elongate impermeable element, to a method of making such paper, and to documents made therefrom.

2. The Prior Art

It is generally known to include in security paper, as a security feature, elongate security elements such as threads, strips or ribbons of, for example, plastic film, metal foil, metallised plastic, and metal wire. These security elements are included in the thickness of security paper to render imitation of documents produced from the paper more difficult. These elements help in the verification of security documents as they render the view of the documents in reflected light different from that in transmitted light. To increase the security provided by the inclusion of such an elongate element, it is also known to endow the element itself with one or more verifiable properties over and above its presence or absence. Such additional properties include magnetic properties over and above its presence or absence. Such additional properties include magnetic properties, electrical conductivities, the ability to absorb x-rays and fluorescents.

As a further security feature, it has been found to be particularly advantageous to provide windows in one side of the surface of the paper, which expose such elongate elements at spaced locations. Examples of methods of manufacturing such paper incorporating security elements with or without windows are described below. It should be noted that references to "windowed thread paper" include windowed paper incorporating any elongate security element.

EP-A-0059056 describes a method of manufacture of windowed thread paper on a cylinder mould paper-making machine. The technique involves embossing the cylinder mould cover and bringing an impermeable elongate security element into contact with the raised regions of an embossed mould cover, prior to the contact entry point into a vat of aqueous stock. Where the impermeable security element makes intimate contact with the raised regions of the embossing, no fibre deposition can occur. After the paper is fully formed and couched from the cylinder mould cover, the contact points are present as exposed regions which ultimately form windows, visible in reflected light, on one side of a banknote paper.

WO-A-93/08327 describes a method of manufacturing windowed thread paper on a Fourdrinier paper-making machine. A rotating embedment means, with a modified profile for embossing, is used to drive an impermeable elongate security element into draining paper stock, on a Fourdrinier wire. The profile of the embedment means is such that raised portions are provided which remain in contact with the security element during the embedment process. Thus, paper fibres are prevented from collecting between the security element and embedment means, such that the security element is subsequently exposed in windowed regions of paper.

For production reasons, the security element used in windowed or non-windowed paper is oscillated within the paper substrate by a small amount, for example, plus or minus 6 mm from either side of a centre line. This is primarily to assist cutting and guillotining across the thread tracks of stacks of 500 sheets. If the thread was not oscillated, the guillotine blade would be presented with a very sharply defined area, of say 1 to 2 mm wide, of polymer/metal/paper built up from 500 sheets. This tends to blunt or even chip the cutting blade. By oscillating the thread, this area is distributed over a wider area of 10 to 15 mm, easing the passage of the blade through the 500 sheet stack. The result of thread oscillation is that only parallel bars can be used in the design of the windows, if the banknotes made from the paper are all to look the same.

Recent investigations have shown that impermeable threads of 4 mm to 6 mm maximum width can be included in paper using the above methods of paper-making. This is due to the requirement for paper stock to flow around the thread and form complete paper areas on the front of the thread in the finished document.

In Canadian patent specification CA-A-2,122,528, there is described an anti-falsification paper which incorporates a wide impermeable security strip with a width between 2 mm and 4 mm. The paper is of multiply design, with at least two paper layers produced on separate paper machines. The security strip is embedded in a first ply and has perforations along the edges which permit water drainage and hence paper fibre deposition along the edges of the thread. The front of the strip is laid down over raised areas on the embossed cylinder mould cover before the raised areas enter the vat of paper stock so as to create windows of exposed strip in the contact regions. The width of the raised areas is narrower than the strip width to permit permeation through the perforations of the strip by paper fibres. However, the width of strip is so great that the paper formed on the back of the paper has flaws in the form of arbitrary holes in the region of the strip. A second ply of ordinary paper is independently formed and the two are laminated together and further processed, the second ply thereby covering the flaws in the back of the first ply and providing at least one homogenous paper surface. In another embodiment, a third ply is laminated over the front of the first ply to wholly embed the security strip. In yet another embodiment, the width of the strip is selected to be so wide that no paper forms on the back of the first paper ply to provide a continuous exposed area on the back. The front of the strip is laid on a continuous raised area on the mould cover before the raised areas enter the vat of paper stock to provide a continuous exposed area on the front. A second ply of paper is then laminated to the first ply to form the finished security paper and give a homogenous paper layer on one side and a continuous exposed strip on the other.

In all of the prior art methods described above, the width of the elongate element which can be used is very limited. Furthermore, the areas of the threads which are exposed are restricted in terms of shape, due to the limitation imposed by the required embossings, and in terms of the areas, due to the nature of the paper-making technique itself.

One object of the present invention is therefore improved method of manufacturing to provide a paper containing a wide impermeable substrate which can be used as a security or non-security feature to describe windows or decorative patterns.

SUMMARY OF THE INVENTION

According to the invention there is therefore provided a method of making single ply paper having an elongate strip at least partially embedded therein, wherein substantially no paper fibres are deposited on one side of the strip in a central region between edges of the strip to thereby expose a continuous area of the strip at a first surface of the paper, characterized by the steps of blinding one or more selected areas of a porous support surface, depositing a first layer of paper fibres onto the porous support surface around the blinded areas, bringing an impermeable strip to lie in contact with the blinded areas of the support surface such that at least the edges of the strip overlie the deposited layer, and depositing a further layer of paper fibres over the first layer and the impermeable strip to securely embed the edges of the strip within the paper, the blinded areas being impermeable to substantially prevent the deposition of fibres thereon before the strip is laid thereover and to thereby form a plurality of discrete translucent or transparent windows in a second surface of the paper in which the strip is exposed.

The preferred prior art production methods for windowed security paper require an embossed cylinder mould cover. The use of blinding is not generally used in paper-making techniques for the very reason that the paper is preferred to be uniform and consistent. The appearance of holes and perforations is not a feature which is usually required. One exception is the paper used for making tea bags, but the method of manufacturing such paper does not include blinds.

As the impermeable strip contacts the support surface after some paper fibres have already been deposited round the blinded areas, it prevents any further fibre deposition over the blinded areas preserving the designs created in the blinding operation as clear areas. Whilst the use of embossed cylinder moulds covers restricts the width of security threads which can be embedded, with the method of the present invention it is possible to produce a document with any width of impermeable strip, up to full document width, with paper "coatings" in any design, including watermarks, on the front side of the document. The back of the paper can be made to contain a continuous exposed strip which can be used for the display of indicia and the like.

An adhesive is preferably applied to tie one side of the strip before bringing that side into contact with the support surface.

An adhesive is preferably applied to one or more portions of the other side of the strip.

The strip is preferably not oscillated during manufacture of the paper.

This provides an advantage in design terms as it means that more precised and detailed patterns can be created around the strip.

The invention further provides single ply paper made by the above mentioned method, said paper having first and second surfaces and an elongate strip, in which the edges of the strip are embedded fully between the first and second surfaces, and a continuous width of a central section of the strip is exposed at the first surface of the paper, in which the strip is impermeable and the other side of the strip is at least partially covered by a layer of paper of reduced opacity forming the second surface.

The second surface of the paper is preferably provided with a plurality of discrete windows in which portions of the strip are exposed at intervals.

The width of the strip preferably lies in the range of 6 to 25 mm.

Such a broad width advantageously ensures that few or no fibres are deposited thereon. The width of the strip more preferably lies in the range of 8 to 10 mm.

Preferably the strip bears indicia, images or information.

Preferably the strip is wholly or partially metallised or bears one or more holographic images.

The strip has preferably one or more colour shift areas and/or has at least one security embossing.

The strip may be printed on one or both sides and/or may bear a liquid crystal material.

The strip preferably has a thickness of 25 to 100 micrometers and more preferably of 50 micrometers.

One side of the strip is preferably coated with an adhesive.

The other side of the strip may be partially coated with an adhesive in regions such that some paper is formed in the adhesive regions to provide paper patterns along the exposed central section of the strip.

The invention also provides a document produced from the aforementioned paper or a security document.

The invention will now be described, by way of example only, with reference to the accompanying drawings.

DETAILED DESCRIPTION OF THE PREFERRED EMBODIMENTS

The method of manufacturing paper according to the present invention is illustrated firstly with reference to FIGS.

Figure 7:
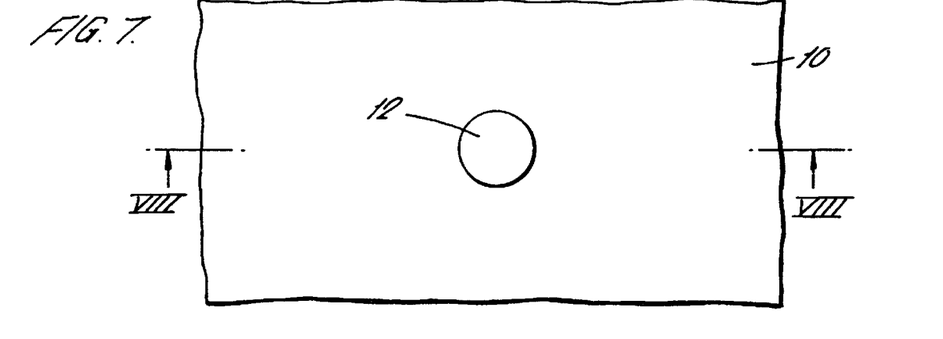
FIG. 7 is a plan view of the section of the cylinder mould cover for use in making an alternative embodiment of paper according to the present invention by blinding only.
Figure 8:
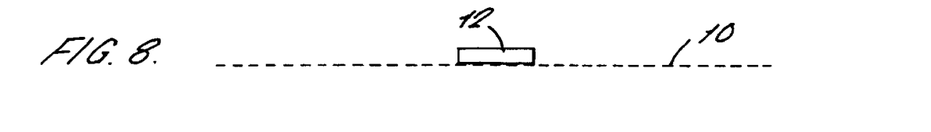
FIG. 8 is a cross-sectional side elevation of the cylinder mould cover of FIG. 7 on the line VIII—VIII.
Figure 9:
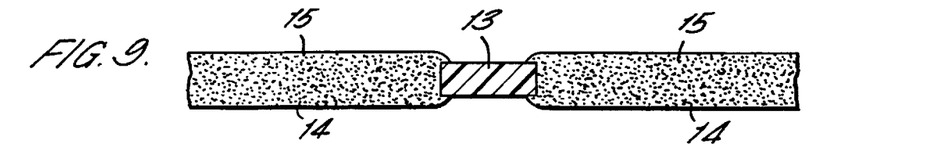
FIG. 9 is a cross sectional side elevation paper formed on the cylinder mould cover of FIG. 7, taken on the line IX—IX FIG. 10.
Figure 10:
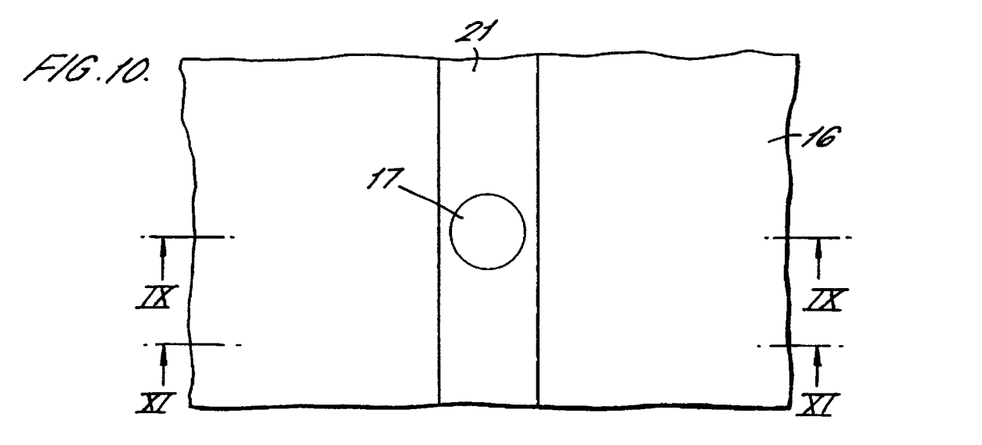
FIG. 10 is a plan view of the paper FIG. 9.
Figure 11:
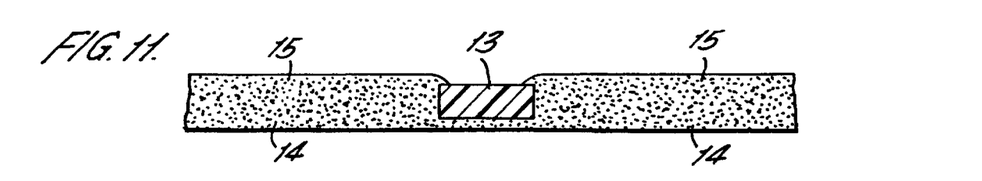
FIG. 11 is a cross-sectional side elevation of the paper of FIG. 10 taken on the line XI—XI.
Figure 12:
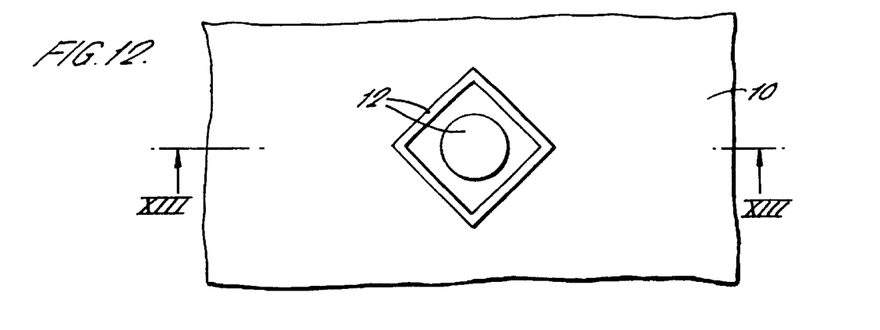
FIGS. 12 to 16 are similar views to those of FIGS. 7 to 11 showing a more complex design formed by blinding.
Figure 13:
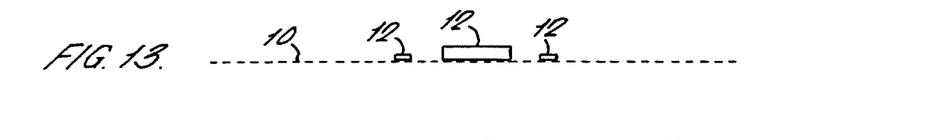
Figure 14:
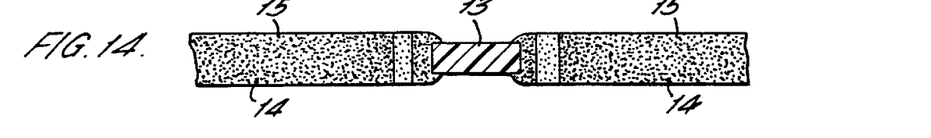
Figure 15:
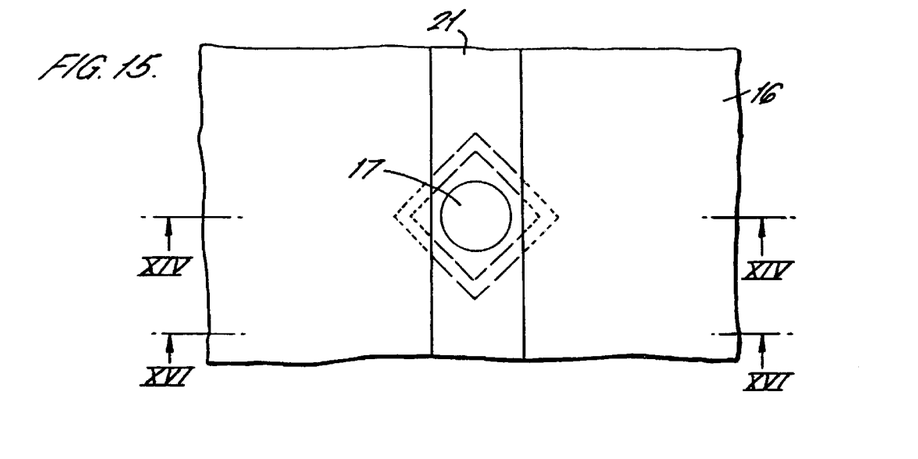
Figure 16:
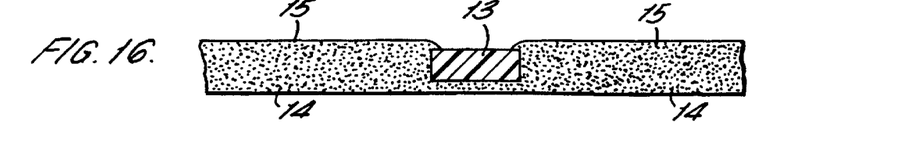
Figure 17:
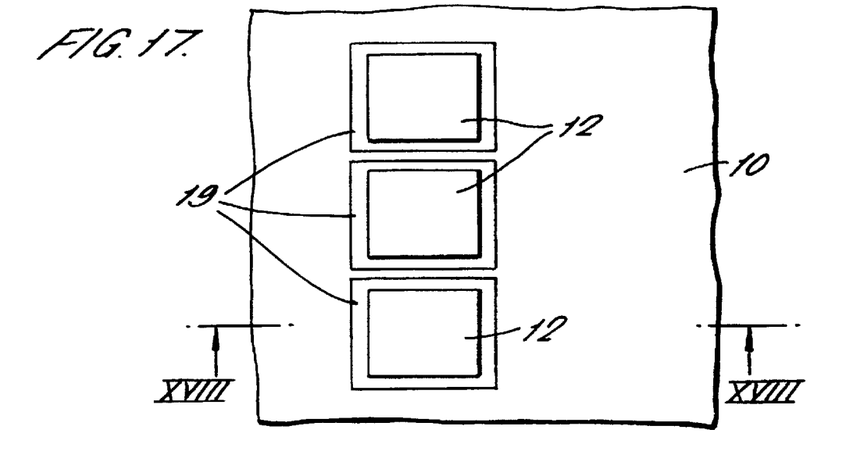
FIG. 17 is a plan view of a section of a cylinder mould cover for use in making one embodiment of paper according to the present invention by embossing and blinding.
Figure 18:
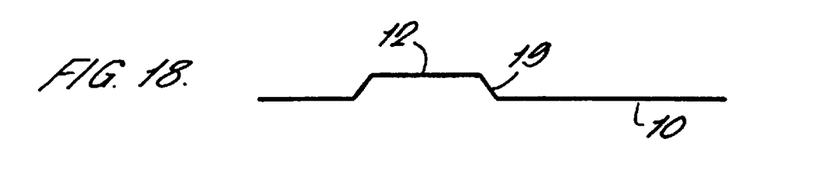
FIG. 18 is a cross-sectional side elevation of the cylinder mould cover of FIG. 7 on the line XVIII—XVIII.
Figure 19:
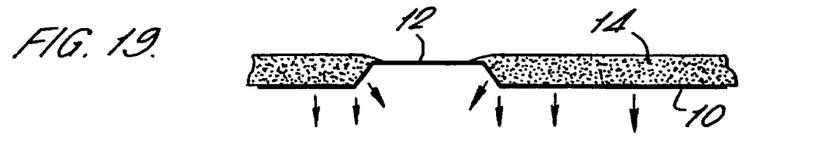
FIG. 19 is the same cross-sectional elevation as FIG. 8 showing partial deposition of paper fibres during a paper-making process.

1 to 11. A porous support surface, for example in the form of a cylinder mould cover 10, is produced in a known way. The mould cover 10 has no raised areas formed by embossing, such as those described in EP-A-0070172, but selected areas 12 regions are blinded by fixing blinding material to the mould cover 10. The blinding material is typically a metal which is welded to the cylinder mould cover 10 (see FIGS. 2, 7 and 8), and these blinds define the shape of windows 17 formed in the final paper 16. The blind material 12 may also be wax, polymer or any other material which can be securely attached to the cylinder mould cover 10 to prevent drainage and hence fibre deposition. In this specification the term "window" includes a transparent or translucent region in the paper of regular or irregular shape and occurrence.

Figures 1, 2:
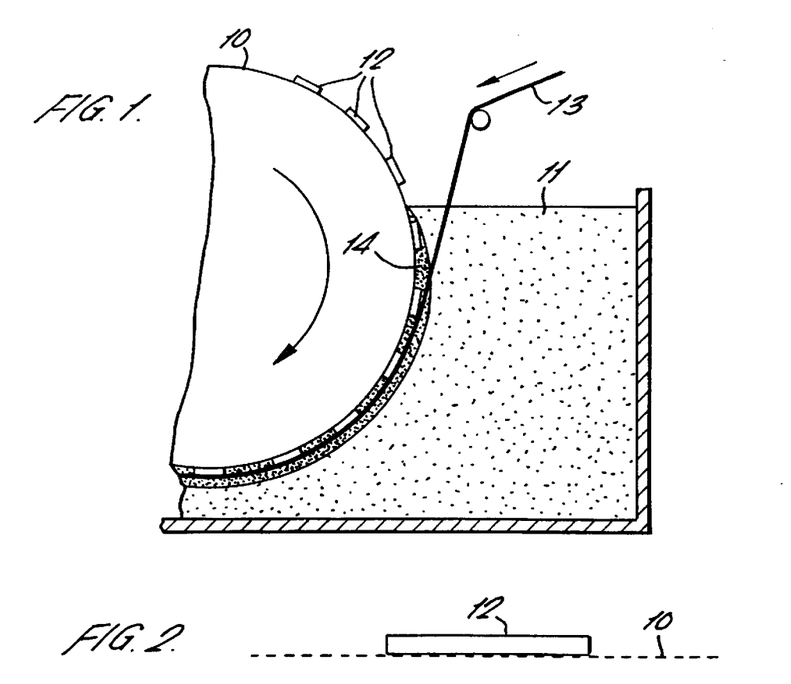
FIG. 1 is a cross-sectional side elevation of a schematic of a paper-making vat for use in the method and manufacturing of paper according to the present invention.
FIGS. 2 to 6 are cross-sectional side elevations of the steps involved in the method of forming paper according to the present invention.
Figure 3:
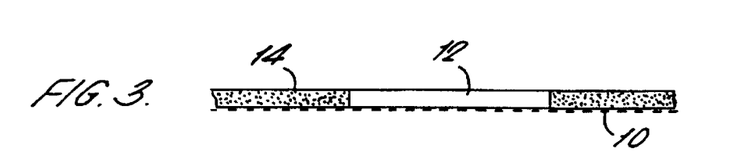
Figure 4:
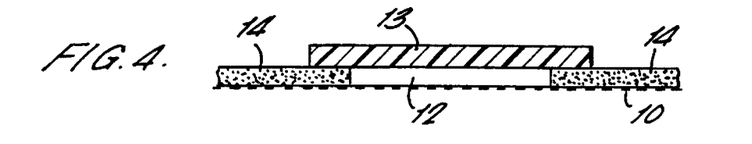
Figure 5:
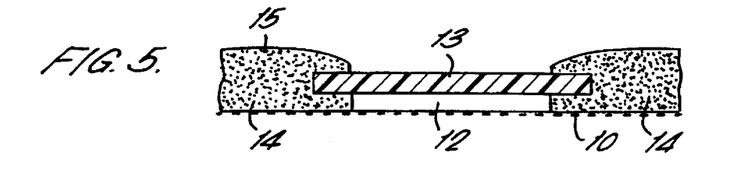
Figure 6:
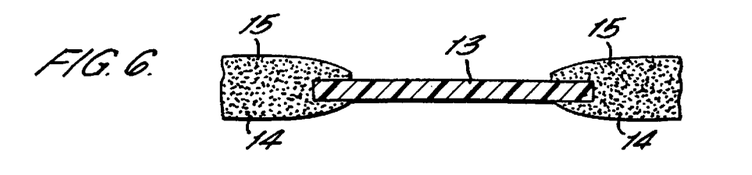

In a known manner, the cylinder mould cover 10 is rotated in a vat of paper stock 11 as illustrated in FIG. 1. As it rotates, a wide elongate impermeable substrate 13, preferably having a width of 6 mm or greater, is brought into contact with the cylinder mould cover 10 below the level of the paper stock 11. This means that a layer 14 of paper fibres has already been deposited onto the cylinder mould cover 10 to form, say, a 40 gsm sheet (see FIGS. 3 and 4). Once the impermeable substrate 13 is brought into contact with the blind material, further paper fibres 15 are deposited on top of and around the sides of the impermeable substrate 13 to form the remainder of the sheet 15 to, typically, 80 to 90 gsm (see FIGS. 5 and 6 or 9). Preferably no oscillation of the impermeable substrate 13 is allowed to take place during manufacture.

Thus, as mentioned above, a layer of paper fibres is laid down on the cylinder mould cover 10 prior to the introduction of the substrate 13. However, whilst the blinded areas 12 would retain little or no covering of paper fibres before the substrate 13 is bought into contact therewith, full coverage is obtained in the surrounding areas between the blinded areas 12. Equally, because of the impermeable nature of the substrate 13, there is little or no covering of paper fibres retained over the majority of the top of the substrate 13. Thus, when the paper 16 is removed from the cylinder mould cover 10 (see FIG. 10), the paper 16 incorporates a wide strip 13 of impermeable substrate, the edges of which are wholly embedded between the two surfaces of the paper 16 to hold the strip 13 securely in position. If the strip 13 is transparent, there will be one or more translucent or transparent windows 17 in the paper corresponding to the blinded areas 12.

A further example of paper which can be produced accordingly to the invention is shown in FIGS. 12 to 16 in which a more complex design is used in the blinding of the cylinder mould cover 10. Here, the blinds used have variable height and/or width to produce various degrees of transparency in defined areas depending on whether the blinding material is covered by the strip 13 or not.

Figure 20:
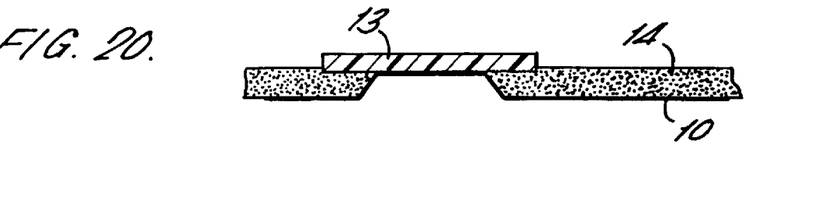
FIG. 20 is the same cross-sectional elevation as FIGS. 18 and 19 showing an impermeable element laid over the cylinder mould cover.
Figure 21:
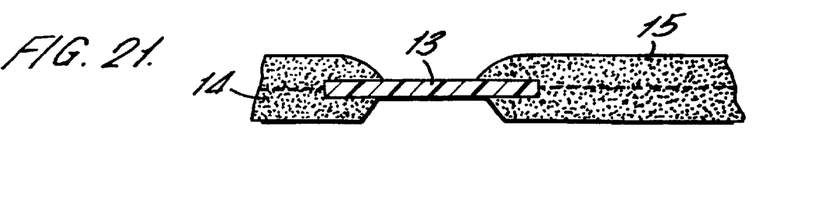
FIG. 21 is the same cross-sectional elevation as FIGS. 18 and 20 showing the paper formed on the cylinder mould cover of FIG. 17.

In a modification of the present invention as shown in FIGS. 17 to 21, the cylinder mould cover 10 is produced in a known way, using dies to form the wire by embossing to form one or more raised areas 19. These raised areas 19 define the shape of the windows 17 in the final paper 16. The top surfaces of the raised areas 19 are then blinded with blind material 12. The width of the raised areas 19 is such that, as the impermeable strip 13 is brought into contact therewith below the level of the stock 11, its edges overhang the raised areas 19 on either side, as shown in FIG. 20.

Figure 22:
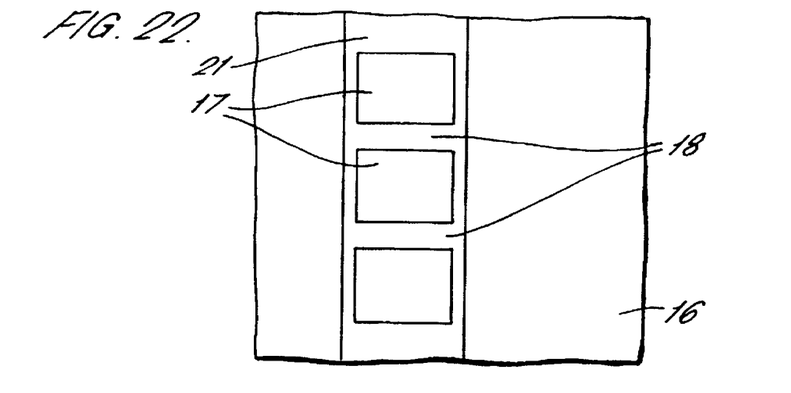
FIG. 22 is a plan view of paper formed using the cylinder mould cover of FIG. 17 by the steps shown in FIGS. 18 to 21.

In either method, the impermeable strip 13 may have a uniform adhesive or other appropriate coating on at least one side. Thus when the strip 13 is introduced into the vat of paper stock 11 (see FIG. 1), the coated side of the strip 13 lies against the mould cover 10 (see FIG. 22), to ensure that full bonding of the fibres and strip 13 takes place in the fibre bridges 18 and along the edges of the strip 13. Paper formation continues around the mould cover 10 forming over the edges of the strip 13. Few or no fibres are deposited over the non-adhesive coated areas mainly due to the width of the strip 13 as the substrate, from which it is preferably made, is preferably hydrophobic. However the adhesive coating is preferably hydrophilic and will tend to draw fibres away from the strip surface. The few fibres that are deposited on the non-adhesive coated areas will be subsequently removed by the press rolls and in the drying cylinders of the final stages of the typical paper-making process.

In an alternative embodiment of the present invention a hydrophobic coating may be used on the non-adhesive coated areas, to assist in preventing any fibre covering.

Where some fibres are deposited on the blinding material before the strip 13 is introduced, the paper fibre density thus formed is considerably reduced due to the lower percentage of fibres present than in the rest of the surrounding paper. This forms a clearly visible translucent or even transparent "stripe" 21 (see FIGS. 10 and 15) in both reflected and transmitted light on the first or "wire" side of the paper. Within this stripe 21, the strip 13 is partly exposed in the windows 17. On the second side of the paper, the "felt" side, the central section of the strip is wholly exposed. When larger blinds are used (FIGS. 2 to 6), less paper is formed before the strip 13 is introduced and the more transparent is the stripe 21. Where smaller blinds are used (FIGS. 7 to 11) more paper is formed so the stripe 21 is more translucent.

This process therefore enables a wide strip of an impermeable substrate, of a width in a range of say 6 mm to 25 mm, to be included in a paper substrate. The width of the strip 13 could be very close to banknote width, so that in finished banknotes just a narrow margin of paper runs down each edge of the note. (NB: although the strip 13 in such a context may not be narrow and elongate and therefore appropriate to be described as a strip with respect to the finished banknote, it is a strip with respect to the full sheet of paper during manufacturing. Thus any reference in this specification to a "strip" should be interpreted accordingly). When viewed in reflection from the wire side, large transparent windows 17 can be made which are highly visible within the translucent stripe 21.

This wide strip 13 of impermeable substrate may be used as a display surface for indicia, for example, de-metallised images, holographic images, colour-shifting areas, print or combinations of any or all of these which are highly visible in the large windows 17. However, if a plain clear strip 13 is used, the windows 17 will be partially translucent or wholly transparent. When viewed in transmission, from the wire side the indicia, the metallisation or colouring on the fully embedded edges of the strip 13 also become visible. These edges may be provided with indicia which bleed from or complement any indicia contained on the exposed portion of the strip 13.

Depending on the width of the strip the windows 17 could be, for example, 20 mm square or 5 mm×15 mm rectangles.

When viewed from the felt side of the paper 16, the strip 13 itself can be seen in a continuous exposed area as a transparent, shiny, coloured or metallised area which may bear indicia, information or imagery. The area may extend along the full length or width of the paper 16 or a substantial part thereof. Furthermore if the blinds with or without embossings form an image or geometric pattern other than straightforward rectangular or square windows 17, this pattern can be seen along the length of the strip 13, with the transparent strip 13 being wholly or partially visible with these windows.

One preferred material for the strip 13 is a PET strip of, say, 50 micrometers thickness as this would help to maintain the "bulk" of the paper 16 over the windowed region. However, other materials such as OPP, PE or PK with other thicknesses may be used. In one embodiment, de-metallised images are used which have large areas of transparent regions to provide a greater contrast within the windows between the metallised and non-metallised areas. When the paper 16 is viewed from the wire side of the paper 16, the visibility of the paper bridges 18 between the windows 17 is enhanced by its contrast to the metallisation.

In previous embodiments of the invention, it is described how an adhesive may be applied uniformly to one side of the strip 13, whilst the other side is coated with adhesive in bands and slit so that only the edges of the element 13 have the adhesive coating. Adhesive patterns could additionally be applied by a transfer or other type of printing process to provide additional paper patterns on the felt side of the paper 16.

However, in a further embodiment of the invention an adhesive or coating may be applied to the whole of both sides of the strip 13. This results in the deposition of a layer of paper on the felt side, such that the strip 13 is wholly covered on that side. In the region of the second part of the strip 13 the translucent stripe 21 is still clearly visible in comparison to the surrounding paper 16.

A standard adhesive or coating used in known processes for making embedded windowed security thread could be used, or any form of thermally activated adhesive or a water based adhesive which provides a hydrophilic surface to hold paper fibres during the initial stages of paper formation.

Figure 23:
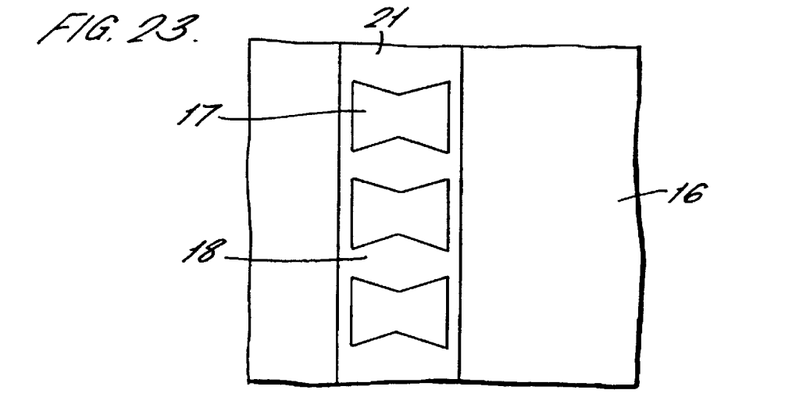
FIGS. 23 to 26 and 28 and 29 are plan views of alternative papers made according to the invention using different cylinder mould cover layouts.
Figure 24:
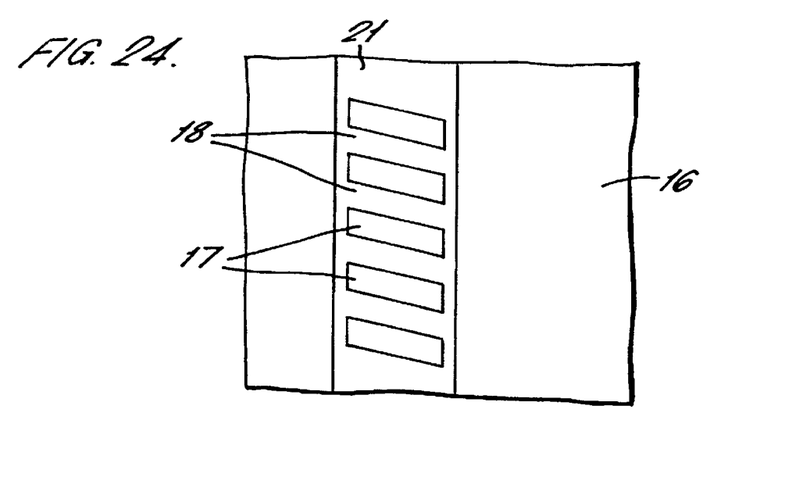

The combination of a wide strip 13 of impermeable substrate, preferably zero oscillation of the strip 13 during processing, and the blinding of the cover 10 enables the provision of other interesting features not currently available in the prior art. These include the modification of the paper bridges 18 to form designs and other indicia. Chevron, waves and other geometric patterns can be produced including more elaborate designs and alphanumeric patterns. Some examples are shown in FIGS. 23 and 24.

The use of electrotype technology to create the blinds on the mould cover 10 allows regular transparent windows to be produced by using wide flat areas of plates in any shape. However, the use of narrow electrotype does not produce transparent regions, but instead translucent regions which can be of fine detail. This provides a highly visible effect with the electrotype image enhanced within the light band in the region of the strip 13.

Figure 25:
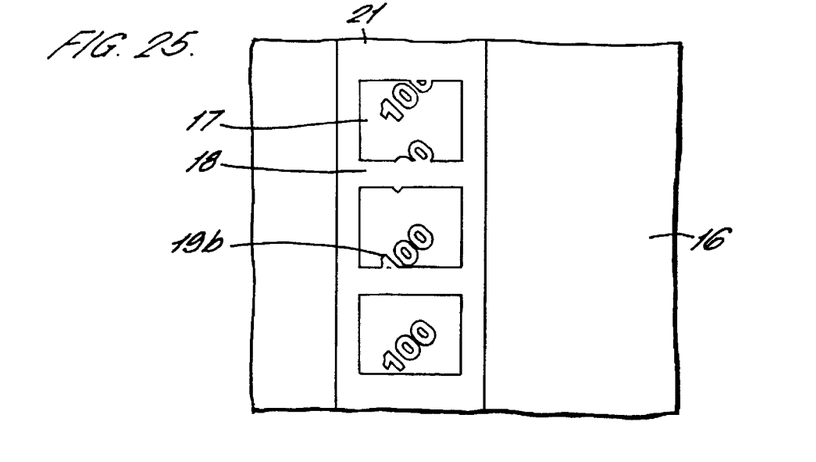
Figure 26:
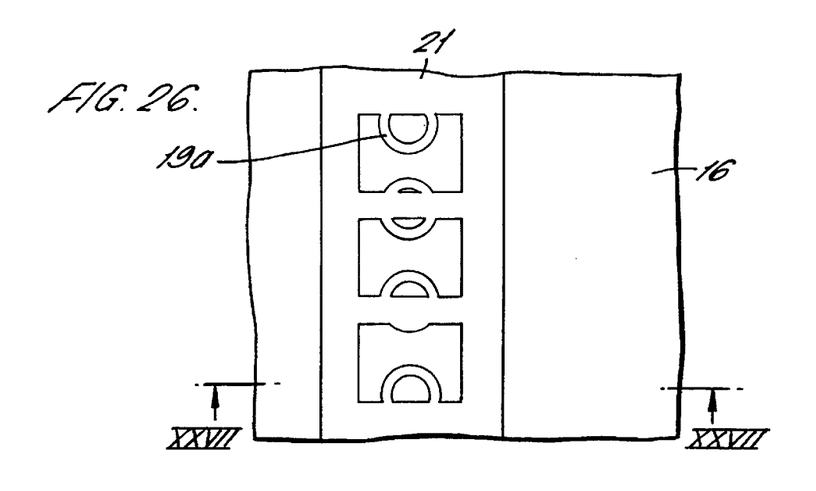
Figure 27:
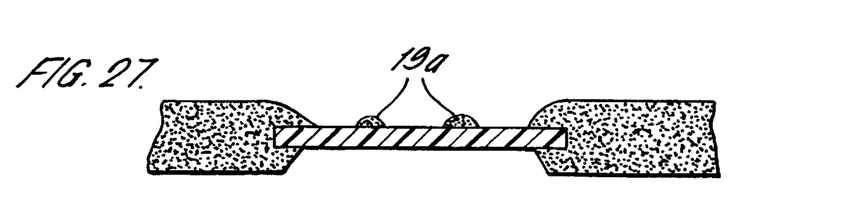
FIG. 27 is a side cross-sectional elevation of the paper of FIG. 26 on the line XXVI—XXVI.

The strip 13 can advantageously be used as an information carrier and/or can contain a wide variety of known security features. These may include the following;

de-metallised designs, which may comprise areas of substantially removed metal to take advantage of the transparency of the base film and provide a large area of transparent window 17;

holographic designs, which could comprise areas of full metal and half-tone screens to provide partial transparency and/or no metal. Under certain viewing conditions, with no metal, a holographic image is still visible;

front to back print registration, in which features are printed which would clearly exhibit Moiré patterns from both from and back if a counterfeit were attempted. Alternatively, such patterns could be produced on a transparent film prior to insertion of the strip 13 into the paper as a security feature itself. The exact reproduction of such patterns are very difficult to mimic;

different coloured print showing on the front to the back. The print may be on either side of the strip or both on the same side, with one colour hidden by the other on one side but showing through on the other side;

liquid crystal films, such as those described in WO-A-94/02329, in which colour changes are visible when a molecular liquid crystal material is coated onto a watermark. Due to the scatter effect of the paper surface, a large percentage of the possible colour intensity is lost. By using a fully transparent window, a very vivid colour change is visible both in reflection and transmission;

luminescent or magnetic materials;

embedded de-metallised regions. As the areas of the strip 13 at each edge are completely embedded, these can contain a de-metallised type image which would only become visible when the document was viewed in transmission. This area may also mimic a similar adjacent area which is visible in reflection and transmission or the metallisation could bleed out to the adjacent area;

security embossing of transparent film with a security design (e.g. a treasury seal) created during the printing process. These may be blind embossed to produce a tactile/visible feature or could include printing inks to further enhance visibility;

contact measurements in which at least one side of the strip is available for contact along its entire length. Measurements can include resistance measured on a current being passed through the strip; contact to microcircuitry embedded within the strip; contact to activate a material within the strip, e.g., PVDF electrochromic; conductive polymers;

the application of an adhesive or coating in a print process such as a transfer process to the continuously exposed side of the strip such that selective deposition of paper fibres also occurs in those areas. These could form registered or non-registered designs, and would be difficult to reproduce by a counterfeiter. FIGS. 25 and 26 illustrate such a feature in which paper fibres are selectively deposited to form images, patterns, alphanumeric numerals etc. e.g., 19*a* and 19*b*.

With such a large area available, it is possible to combine many features together on a strip 13.

Figure 28:
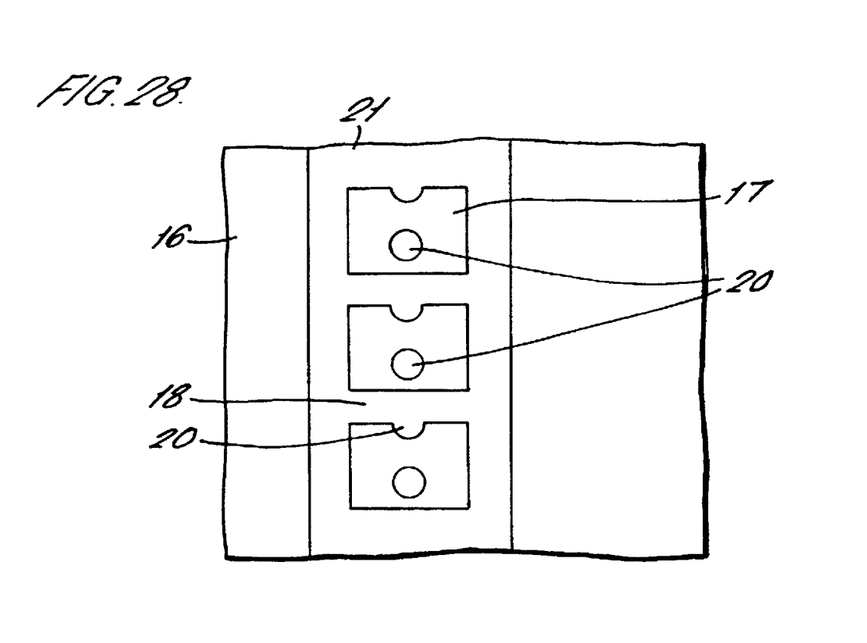
Figure 29:
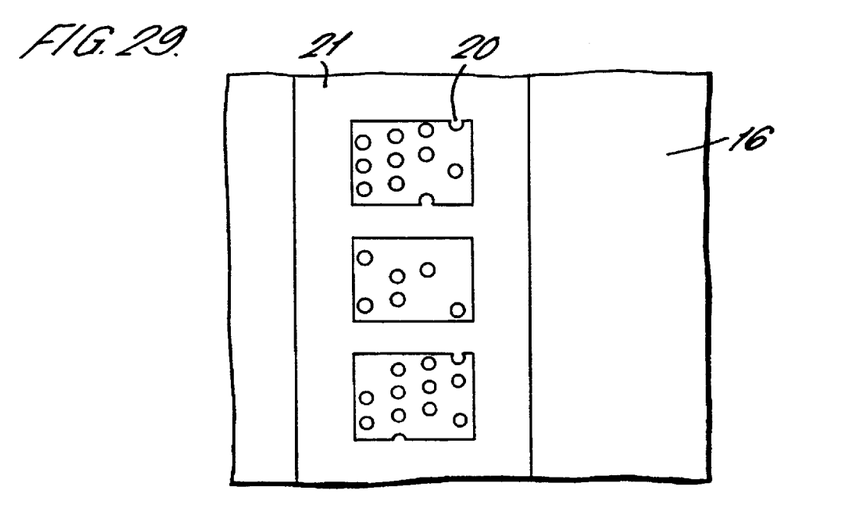

In addition, the strip 13 could be perforated with holes of various shapes to provide novel features or possibly machine readability, e.g. via airstreams, as shown in FIGS. 28, 29.

The paper 16 described above can be cut and printed to make all forms of documents, including security documents such as banknotes, cheques, travellers cheques, identity cards, passports, bonds etc.

A second ply of paper substrate could be laminated to paper as described above to completely obscure the visible effects of the strip 13 one side, if required.

What is claimed is:

1. A method of making single ply paper having an elongate strip at least partially embedded therein, wherein substantially no paper fibers are deposited on one side of the strip in a central region between edges of the strip to thereby expose a continuous area of the strip at a first surface of the paper characterized by the steps of blinding one or more selected areas of a porous support surface, depositing a first layer of paper fibres onto the porous support surface around the blinded areas, applying an adhesive or other coating to one side of an impermeable strip, bringing said one side of said impermeable strip with adhesive or other coating thereon to lie in contact with the blinded areas of the support surface such that at least the edges of the strip overlie the deposited layer, and depositing a further layer of paper fibres over the first layer and the impermeable strip to securely embed the edges of the strip within the paper, said blinded areas being impermeable to substantially prevent the deposition of fibres thereon before the strip is laid thereover and to thereby form a plurality of discrete translucent or transparent windows in a second surface of the paper in which the strip is exposed.

2. A method as claimed in claim 1 in which an adhesive is applied to one or more portions of the other side of the strip.

3. A method as claimed in claim 1 in which the strip is not mechanically oscillated during manufacture of the paper.

4. Single ply paper made by the method of claim 1, said paper having first and second surfaces and an elongate strip at least partially embedded therein, in which edges of the strip are embedded fully between the first and second surfaces, and a continuous length of a central section of one side of the strip is exposed at the first surface of the paper, wherein the strip is impermeable and the other side of the strip is at least partially covered by a layer of paper of reduced opacity forming the second surface.

5. Single ply paper as claimed in claim 4 in which the second surface of the paper is provided with a plurality of discrete windows in which portions of the strip are exposed at intervals.

6. Single ply paper as claimed in claim 4 in which the strip has a width lying in the range of 6 to 22 mm.

7. Single ply paper as claimed in claim 4 in which the strip bears indicia, images or information.

8. Single ply paper as claimed in claim 4 in which the strip is wholly or partially metallised.

9. Single ply paper as claimed in claim 4 in which the strip bears one or more holographic images.

10. Single ply paper as claimed in claim 4 in which the strip has one or more colour shift areas.

11. Single ply paper as claimed in claim 4 in which the strip has at least one security embossing.

12. Single ply paper as claimed in claim 4 in which the strip is printed on one or both sides.

13. Single ply paper as claimed in claim 4 in which the strip bears a liquid crystal material.

14. Single ply paper as claimed in claim 4 in which the strip has a thickness of 25 to 100 micrometers.

15. Single ply paper as claimed in claim 4 in which the strip has a thickness of 50 micrometers.

16. Single ply paper as claimed in claim 4 in which one side of the strip is coated with an adhesive or other coating.

17. Single ply paper as claimed in claim 16 in which another side of the strip is partially coated with an adhesive in regions such that some paper is formed in the adhesive regions to provide paper patterns along the exposed central section of the strip.

18. A document produced from paper as claimed in claim 4.

19. A security document produced from paper as claimed in claim 4.

* * * * *